United States Patent [19]

Sekimoto et al.

[11] 4,137,936
[45] Feb. 6, 1979

[54] BALL VALVE

[75] Inventors: Shigeki Sekimoto, Nagoya; Katsuyuki Suzuki, Yokohama, both of Japan

[73] Assignee: Taimei Kinzoku Kogyo Kabushiki Kaisha, Tokyo, Japan

[21] Appl. No.: 844,682

[22] Filed: Oct. 25, 1977

[30] Foreign Application Priority Data

May 21, 1977 [JP] Japan .................................. 52/58203

[51] Int. Cl.² .............................................. F16K 3/36
[52] U.S. Cl. .................. 137/246.22; 251/17; 251/315
[58] Field of Search ........................ 251/174, 315; 137/246.22

[56] References Cited

U.S. PATENT DOCUMENTS

| | | | |
|---|---|---|---|
| 3,497,177 | 2/1970 | Hulsey | 251/174 |
| 3,504,885 | 4/1970 | Hulsey | 251/174 X |
| 3,583,426 | 6/1971 | Feres | 251/174 X |

*Primary Examiner*—Harold W. Weakley
*Attorney, Agent, or Firm*—Frank J. Jordan

[57] ABSTRACT

A valve including an emergency sealing device comprising a piston slidably fitted in a cylindrical bore formed at inner end of a fluid inlet passage, a seat holder slidably fitted in said piston, a main seat ring supported at the inner end of the seat holder, an auxiliary seat ring supported at the inner end of the piston, a spring arranged between said piston and said seat holder to normally hold the main seat ring against the valve element and the auxiliary seat ring away from the valve element, and a pressure medium supplying means for feeding pressure medium, when required, to press the auxiliary valve seat ring against the valve element to produce emergency sealing action and to further press the main valve seat ring against the valve element with increased pressing force.

7 Claims, 6 Drawing Figures

BALL VALVE

BACKGROUND OF THE INVENTION

The present invention relates to an improvement in a valve of the type which includes a valve body having a cavity formed therein, a valve element rotatably mounted in said cavity and valve seats interposed between said valve element and said valve body in which a fluid passage can be opened and closed by rotating the valve element while maintaining fluid seal by means of said valve seats tightly held against the valve element. More particularly, it relates to an improvement in the construction of such valve seat.

The valve seat is usually made of synthetic resin, synthetic rubber or like material. In such type of valve, metal chips, scales or other foreign materials produced during the piping operation may frequently get into the interface between the valve seats and the valve element to cause damage on the valve seats and/or valve element, resulting in leakage of the fluid through the gap produced therebetween.

In order to prevent such leakage of the fluid, it has been recently proposed to provide an emergency device which includes, in addition to the conventional valve seats or main valve seats, a movable auxiliary valve seat which is normally held in its released position and is actuated into position where the auxiliary valve seat is pressed against the valve element by the action of pressure medium which is supplied when leakage of the main valve seat is produced. Such emergency device does not include a means for returning the auxiliary valve seat into its original position and, therefore, such auxiliary valve seat is tightly pressed against the valve element, after it has been actuated, so that it is impossible or very difficult to rotate the valve element and if the valve element is forcibly rotated under such condition the valve seat may become seriously damaged. Accordingly, such sealing device only serves as an emergency device which temporarily acts to seal the valve when the leakage is produced.

Another type of emergency sealing device has been proposed, which employs a sealant, such as grease, which is fed to the interface between the valve element and the valve seats, when the leakage is produced, to temporarily seal the valve. However such emergency sealing device cannot maintain its sealing action for a long time, that is, the sealant fed to the interface between the valve element and the valve seats becomes easily scattered into the cavity of the valve body under the action of the fluid pressure in the piping and thus cannot maintain its sealing function without supplementing the sealant.

Furthermore an emergency sealing device has been recently proposed, which includes a movable valve seat which is subjected to the fluid pressure to be tightly held against the valve element and an emergency sealant feeding means. This type of the emergency sealing device cannot avoid the disadvantages in the above-mentioned emergency sealing devices.

Accordingly, in the heretofore proposed device it is necessary to repair or substitute the valve seat and/or valve element soon after the emergency device has been actuated.

SUMMARY OF THE INVENTION

It is an object of the present invention to provide a valve in which an emergency sealing action can be effectively obtained when leakage is produced owing to the damage caused on valve seat and/or valve element of the valve.

It is another object of the present invention to provide a valve of the above kind in which the emergency sealing action is produced by an auxiliary valve seat which is actuated to be tightly pressed against a valve element under the action of pressure medium while main valve seat is also pressed into more tight engagement with the valve element under the action of the same pressure medium.

It is another object of the present invention to provide a valve of the above kind in which the auxiliary valve seat is resiliently biased into its release position by means of a spring mechanism, so that it is returned into its release position after it has been actuated for emergency sealing purpose.

In accordance with the present invention there is provided a valve including a valve body having a cavity formed therein and fluid inlet and outlet passages communicating with said cavity, a valve element rotatably mounted in said cavity, and valve seats interposed between said valve element and said valve body, in which at least one of the valve seats comprises a cylindrical piston slidably fitted in a bore formed at the inner end of said passage, an annular seat holder slidably fitted in said piston, a main seat ring mounted at the inner end of said seat holder, an auxiliary seat ring mounted at the inner end of said piston, a spring means interposed between said piston and said seat holder to resiliently urge the piston outward and to resiliently urge the seat holder inward whereby the main seat ring on the seat holder is normally pressed against the valve element while the auxiliary seat ring on the piston is normally kept away from the valve element, and a pressure medium supplying means for feeding pressure medium, when required, to move the piston inward against the action of said spring means to press the auxiliary valve seat against the valve element and, at the same time, press the main valve seat against the valve element with increased pressure due to the combined action of the spring and the pressure medium.

As the pressure medium, various kinds of fluid, for example, gaseous medium such as nitrogen gas, liquid medium such as turbine oil or pasted oil such as grease may be employed. When the grease is employed, it can be also used as a sealant which is fed to the interface between the valve element and the valve seats, as required, to temporarily seal the valve.

PREFERRED EMBODIMENTS OF THE INVENTION

Figure 1:
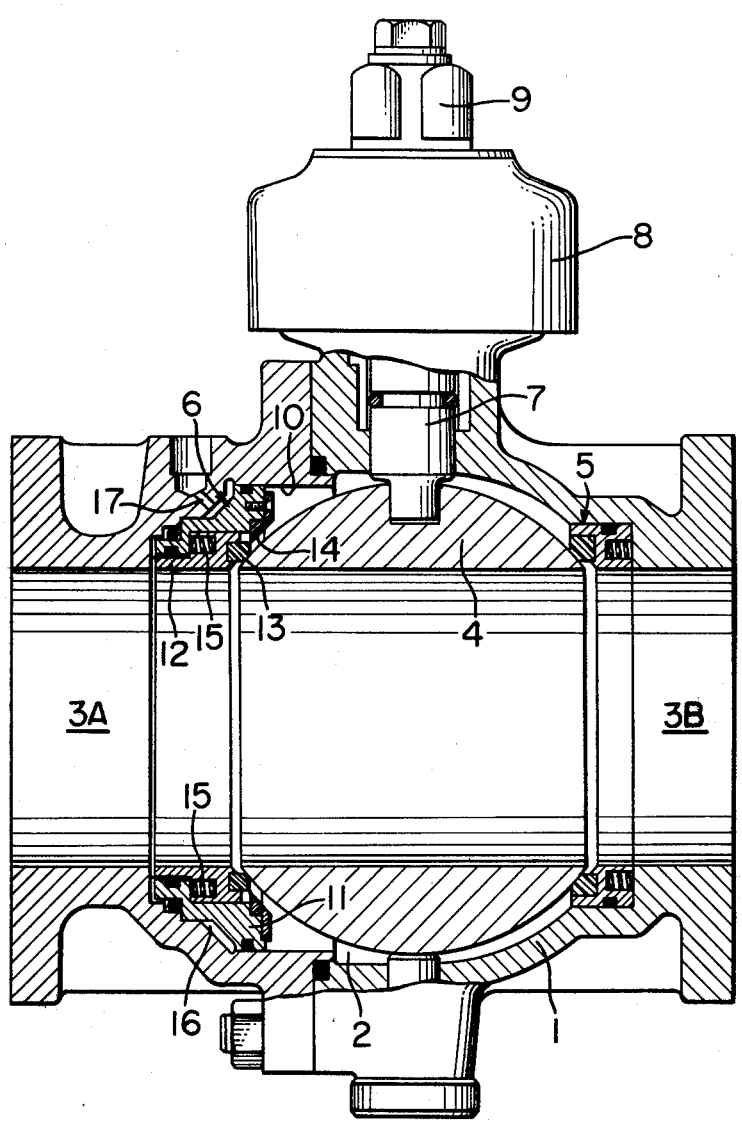
FIG. 1 is a sectional view showing a preferred embodiment of the present invention.

Referring to FIG. 1, which illustrates a preferred embodiment of the present invention, a valve includes a valve body 1 having a cavity 2 formed therein and fluid inlet and outlet passages 3A and 3B, a valve element 4 rotatably mounted in said cavity 2, valve seats 5 and 6 interposed between the valve body and the valve element, a valve stem 7 connected at its inner end with said valve element 4 and a cap 8 connected with the upper end of said valve stem 7 and having at its upper side a portion 9 for engagement with a wrench for actuating the valve. The valve is adapted to be operated by means of the wrench engaging with the portion 9, so that the valve element 4 is rotated to open or close the fluid passage.

In accordance with the present invention, an enlarged cylindrical bore 10 is formed at the inner end of the fluid inlet passage 3A, and the valve seat 6 is slidably fitted within said cylindrical bore 10. As more clearly shown in FIG. 2, the valve seat 6 comprises a cylindrical piston 11 slidable in said bore 10 and an annular seat holder 12 slidably fitted in said piston 11, and a main seat ring 13 is mounted at the inner end of said seat holder 12 while an auxiliary seat ring 14 is mounted at the inner end of said piston 11. The auxiliary seat ring 14 is fixed on the piston 11 by means of a piston flange 14' which serves as a stopper for stopping the inward movement of the piston 11 at a predetermined position, as hereinafter explained more in detail.

Figure 2:
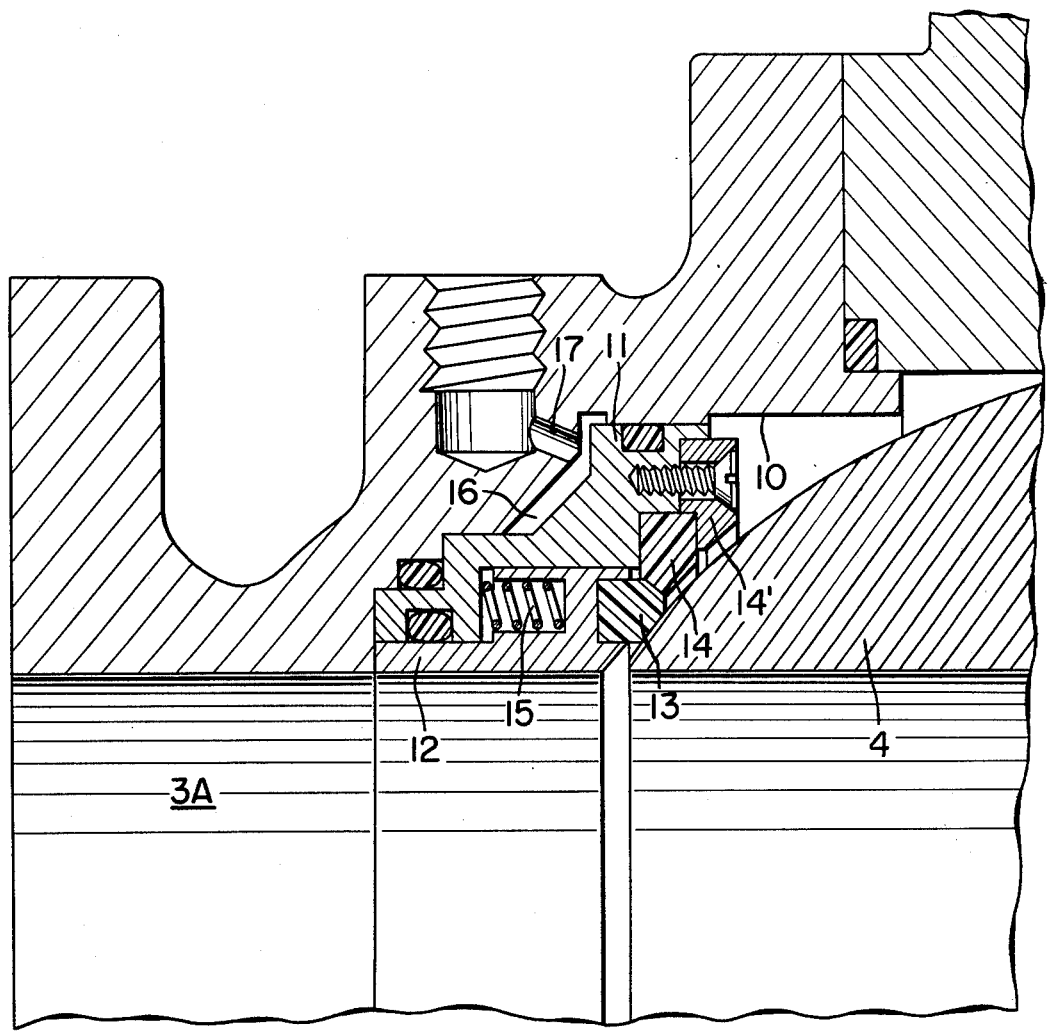
FIG. 2 is a fragmentary sectional view, showing a part of FIG. 1 in enlarged scale.

A spring means is arranged between said piston 11 and said seat holder 12 so that the piston 11 is resiliently pressed outward (to the left as viewed in FIG. 2) while the seat holder 12 is resiliently pressed inward (to the right as viewed in FIG. 2). In the embodiment as shown in FIG. 2, such spring means comprises a plurality of coil springs 15 respectively disposed in axial bores circumferentially arranged in the seat holder 12. Under normal condition, the main seat ring 13 is resiliently pressed against the valve element 4 under the action of the spring 15 while the auxiliary valve seat 14 is resiliently kept away from the valve element 4.

A pressure medium chamber 16 is formed in the cylindrical bore 10 at the rear side of said piston 11. A passage 17 for supplying pressure medium into said chamber 16 is formed in the valve body.

Figure 3:
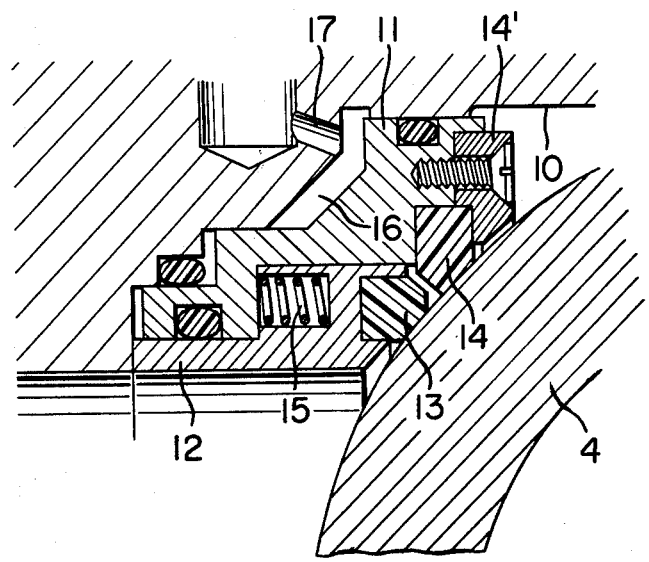
FIGS. 3 and 4 are views similar to FIG. 2 but showing the successive actuated states, respectively.

In the above arrangement of the valve, the main seat ring 13 is normally held against the valve element 4 under the action of the spring 15, which serves to promote the stability and durability of the sealing action, and thus a primary seal is formed thereby. The spring 15 normally serves to hold the piston 11 in its retracted position, whereby the auxiliary seat ring 14 is normally held away from the valve element with a predetermined gap being held therebetween, as shown in FIG. 2. If the main seat ring or the valve element is subjected to some damage on its surface to produce leakage of fluid, the pressure medium is fed through the passage 17 into the chamber 16 to urge the piston 11 toward the valve element against the action of the spring 15. Thus the auxiliary seat ring 14 is pressed against the valve element 4, whereby the emergency sealing effect is produced. The piston 11 further serves to press the main seat ring 13 against the valve element with the increased pressure under the combined action of the spring 15 and the pressure medium, whereby the leakage through the seat ring is reduced. The state of the piston 11 which has been moved by the pressure medium against the action of the spring 15 to press the auxiliary valve seat ring 14 against the valve element 4 and, at the same time, press the main valve seat ring 13 against the valve element 4 with increased pressure due to the combined action of said spring and said pressure medium is illustrated in FIG. 3.

Figure 4:
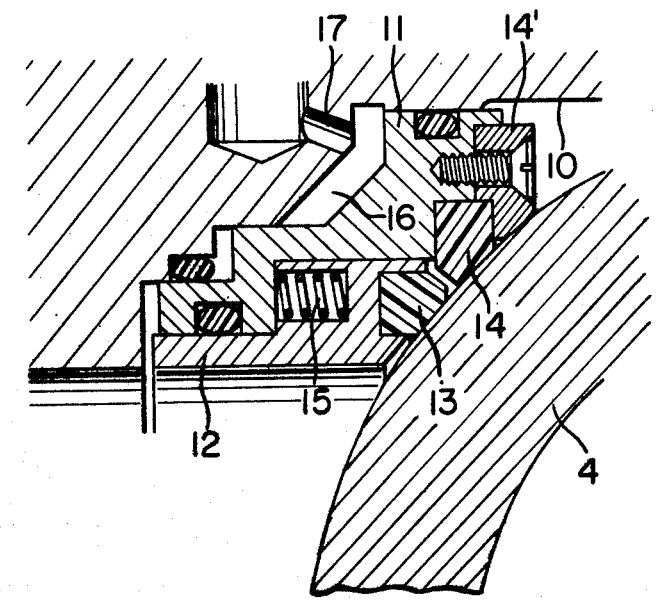

If excessive pressure would be applied to the auxiliary valve seat ring owing to the inward movement thereof against the valve element, the auxiliary valve seat ring could become crushed. In order to protect the valve seat ring from such excessive pressure, the piston flange 14' is so arranged that if the inward movement of the piston 11 is continued after the auxiliary valve seat ring 14 is pressed against the valve element 4 as shown in FIG. 3, said piston flange 14' comes into contact with the valve element 4 to stop the auxiliary valve seat 14 at a predetermined position and prevent further inward movement thereof, as shown in FIG. 4.

Thus the leakage of fluid is avoided by the function of the auxiliary seat ring in pressure engagement with the valve element and also the main seat ring increasing its pressure against the valve element. In the embodiment as shown in FIG. 2, gaseous medium such as nitrogen gas can be advantageously employed as the pressure medium, since the gaseous medium serves to rapidly and positively actuate the emergency sealing device. Liquid oil such as turbine oil can be also employed as the pressure medium.

When it becomes necessary to rotate the valve element to open or close the valve, the pressure medium applied to the chamber 16 is released. Then the auxiliary seat ring 14 is returned to its original position by the action of the spring 15, thus the valve element becomes easily rotated by usual rotating mechanism. Thus the emergency sealing mechanism according to the present invention can be repeatedly actuated.

As the pressure medium for actuating the piston of the emergency sealing mechanism, compressed gaseous medium such as nitrogen gas and liquid medium such as turbine oil can be advantageously employed, as explained above. Other fluid, for example pasted oil such as grease can be employed as well. When the grease is employed as the pressure medium, it can serve to perform additional function, that is, it can be used as a sealant which is fed to the interface between the valve element and the valve seats, when required, to temporarily seal the valve. Such an embodiment is shown in FIGS. 5 and 6.

Figure 5:
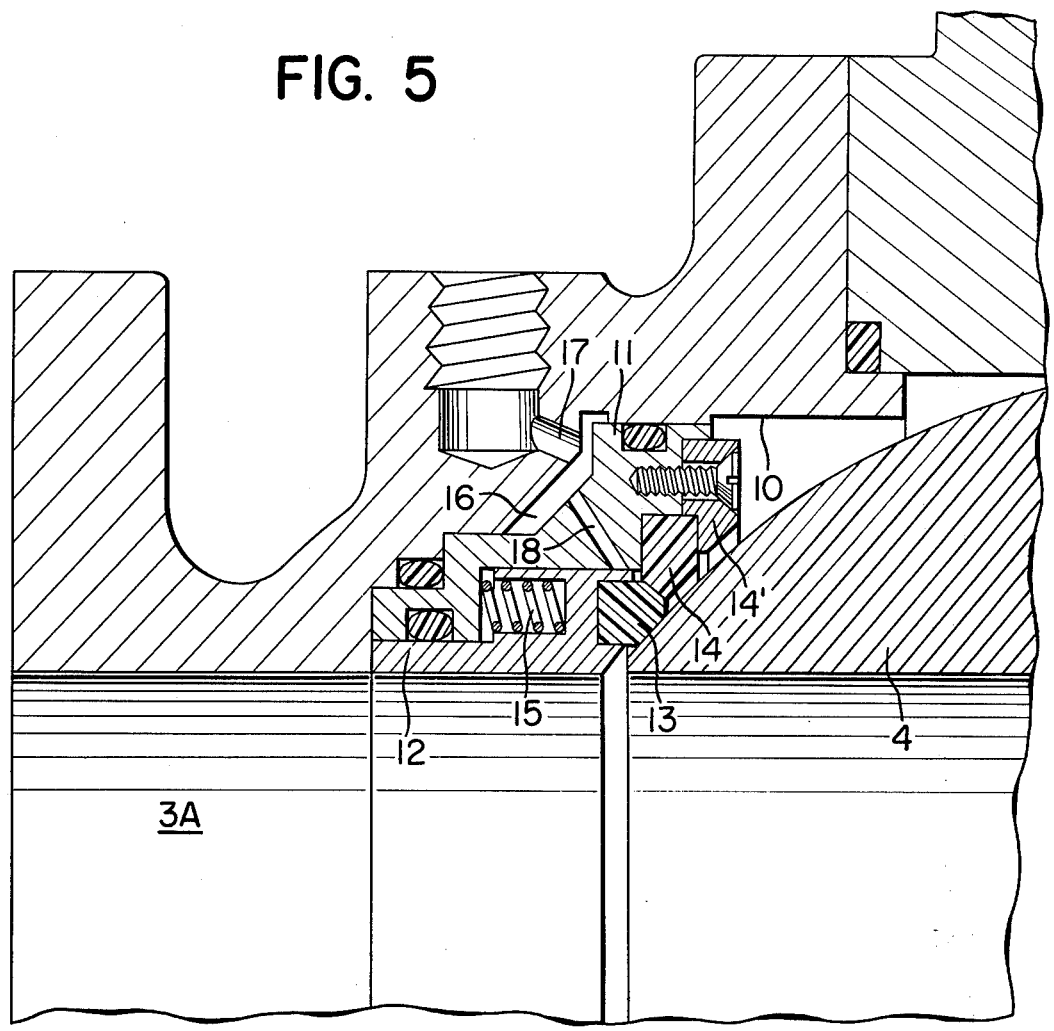
FIG. 5 is a view similar to FIG. 2 showing a modified form.
Figure 6:
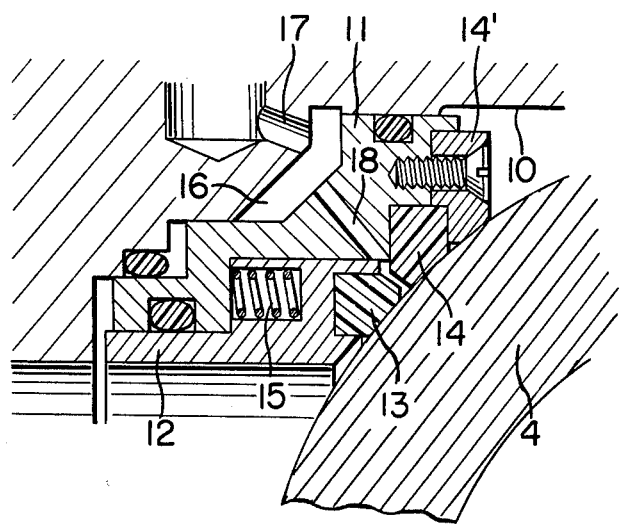
FIG. 6 is a view showing the actuated state of FIG. 4.

In the embodiment as shown in FIGS. 5 and 6, a passage 18 is formed in the piston 11 to feed a part of the grease fed to the chamber 16 to the interface between the seat ring and the valve element. In operation, if the main seat ring 13 or the valve element 4 is subjected to damage to produce leakage of fluid, the grease is firstly fed through the passage 17 into the chamber 16 to urge the piston 11 toward the valve element 4, thereby pressing the auxiliary seat ring 14 to the valve element 4, as shown in FIG. 5. Then, by continuing the feeding of the grease, it is fed through the fine nozzle 18 to the interface between the valve element and the valve seat rings to provide additional sealing function.

The embodiments of the invention as explained above are to be considered in all respects as illustrative and not restrictive, the scope of the invention being indicated by the appended claims, and all changes which come within the meaning and range of equivalence of the claims therefore are intended to be embraced therein.

We claim:

1. In a valve including a valve body having a cavity formed therein and inlet and outlet passages communicating with said cavity, a valve element rotatably mounted in said cavity and valve seats interposed between said valve element and said valve body; the improvement in which at least one of the valve seats comprises a cylindrical piston slidably fitted in a bore formed at the inner end of said passage, an annular seat holder slidably fitted in said piston, a main seat ring mounted at the inner end of said seat holder, an auxiliary seat ring mounted at the inner end of said piston, a spring means interposed between said piston and said seat holder to resiliently urge the piston outward and to resiliently urge the seat holder inward whereby the main seat ring on the seat holder is normally pressed against the valve element while the auxiliary seat ring on the piston is normally kept away from the valve element, and a pressure medium supplying means for feeding pressure medium, when required, to move the piston inward against the action of said spring means to press the auxiliary valve seat ring against the valve element and, at the same time, press the main valve seat against the valve element with increased pressure due to the combined action of the spring and the pressure medium.

2. The improvement according to claim 1, in which compressed gaseous medium such as nitrogen gas is employed as the pressure medium.

3. The improvement according to claim 1, in which liquid oil such as turbine oil is employed as the pressure medium.

4. The improvement according to claim 1, in which pasted oil such as grease is employed as the pressure medium.

5. The improvement according to claim 4, in which the grease is employed as a pressure medium for actuating the piston and as a sealant which is fed to the interface between the valve element and the valve seat to promote the sealing function thereof.

6. The improvement according to claim 5, in which a passage for feeding the sealant is formed in the piston.

7. The improvement according to claim 1 in which the cylindrical piston has a piston flange at the inner end thereof which serves as a stopper for stopping the inward movement of said piston at a predetermined position and preventing further inward movement thereof in order to protect the auxiliary seat ring from excessive pressure which would crash said seat ring.

* * * * *